(12) United States Patent
Nayler et al.

(10) Patent No.: US 6,771,750 B1
(45) Date of Patent: Aug. 3, 2004

(54) PHYSICAL LAYER TRANSCEIVER ARCHITECTURE FOR A HOME NETWORK STATION CONNECTED TO A TELEPHONE LINE MEDIUM

(75) Inventors: Colin Nayler, Sunnyvale, CA (US); Phil Keller, Fremont, CA (US); Oikwan Tsang, San Jose, CA (US); Hung Vo, San Jose, CA (US); Dennis Lau, Fremont, CA (US); Yi Cheng, San Jose, CA (US); Boon-Aik Ang, Santa Clara, CA (US); Zhen-Hua Liu, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/181,559

(22) Filed: Oct. 29, 1998

(51) Int. Cl.[7] .............................................. H04L 25/03
(52) U.S. Cl. ..................................... 379/93.01; 375/318
(58) Field of Search ........................... 379/413.04, 414, 379/404, 390, 93.01; 710/11; 375/316, 317, 219, 287, 328, 318, 319, 216, 217, 220, 224, 227; 370/461; 327/65

(56) References Cited

U.S. PATENT DOCUMENTS

| | | | | |
|---|---|---|---|---|
| 5,012,492 A | * | 4/1991 | Sexton et al. ................ | 375/328 |
| 5,550,836 A | * | 8/1996 | Albrecht et al. ............. | 370/461 |
| 5,608,755 A | | 3/1997 | Rakib | |
| 5,717,720 A | * | 2/1998 | Jackson et al. .............. | 375/316 |
| 6,041,084 A | * | 3/2000 | Nagaraj ...................... | 375/317 |
| 6,067,585 A | * | 5/2000 | Hoang ......................... | 710/11 |
| 6,087,860 A | * | 7/2000 | Liu et al. ..................... | 327/65 |
| 6,134,283 A | * | 10/2000 | Sands et al. ................. | 375/354 |
| 6,154,724 A | * | 11/2000 | Nayler ......................... | 379/350 |
| 6,215,816 B1 | * | 4/2001 | Gillespie et al. ............. | 375/219 |
| 6,226,322 B1 | * | 5/2001 | Mukherjee .................... | 375/229 |
| 6,292,517 B1 | * | 9/2001 | Jeffress et al. ............... | 375/287 |

FOREIGN PATENT DOCUMENTS

| | | |
|---|---|---|
| EP | 0731569 A2 | 9/1996 |
| EP | 0743776 A2 | 11/1996 |

* cited by examiner

Primary Examiner—Minsun Oh Harvey
Assistant Examiner—Daniel Swerdlow (57) ABSTRACT

A physical layer transceiver of a home network station connected to a telephone medium has an architecture enabling adaptation of detection circuitry based on received network signals to enable reliable recovery of data signals. The physical layer transceiver includes an input amplifier that amplifies network signals according to one of 128 gain settings set by a receiver gain control signal. A signal conditioning circuit includes an envelope detector configured for outputting an envelope of the amplified received signal, and an energy detector configured for outputting an energy signal of the amplified received signals. The envelope signal and the energy signal are supplied to slicer threshold circuits, configured for outputting noise, peak, data event and energy event signals based on noise threshold, peak threshold, data transition threshold, and energy threshold signals, respectively. A digital controller controls the input amplifier gain and the threshold values, and adjusts the gain and threshold values based on the noise event signal and the peak event signal within an access ID (AID) interval. Hence, the receiver can be optimized on a per-packet basis for receiving network signals by adjusting the receiver portion during the AID preamble phase of the data packet. Gain control may also be used by the digital controller on the transmitter portion to selectively adjust the output gain for optimizing transmission to a destination home network station.

20 Claims, 5 Drawing Sheets

PHYSICAL LAYER TRANSCEIVER ARCHITECTURE FOR A HOME NETWORK STATION CONNECTED TO A TELEPHONE LINE MEDIUM

FIELD OF THE INVENTION

The present invention relates to network interfacing, and more particularly, to methods and systems for sending and receiving data between network stations connected to a telephone line.

DESCRIPTION OF THE RELATED ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from anther network station may have a value on the order of one to two volts. Hence, the amplitude and shape of a received pulse may be so distorted that recovery of a transmit clock or transmit data from the received pulse becomes substantially difficult.

SUMMARY OF THE INVENTION

There is a need for a network station having a physical layer transceiver capable of reliably recovering data from a received network signal on a telephone line medium.

There is also a need for a physical layer transceiver having a wide dynamic range and capable of adapting to different network signals from different network nodes on a telephone line medium.

There is also need for an arrangement in a physical transceiver receiving network signals from a telephone line medium to recover received data even if the received pulse is highly distorted.

These and other needs are obtained by the present invention, where a physical layer transceiver has an architecture enabling adaptation of detection circuitry based on the received network signal to enable reliable recovery of data signals.

According to one aspect of the present invention, a physical layer transceiver is configured for sending and receiving network signals on a telephone line medium. The physical layer transceiver includes an input amplifier for amplifying network signals received from the telephone line medium and outputting amplified received signals. A signal conditioning circuit is configured for outputting at least one of an envelope signal of the amplified received signals, and an energy signal of the amplified received signals. Slicer circuits are configured for outputting noise, peak, and data event signals indicating whether the envelope signal exceeds a noise threshold, a peak threshold, and a data transition threshold, respectively. The slicer circuits are configured for outputting energy event signals indicating with respect to time whether the energy signal exceeds an energy threshold. A digital controller is configured for controlling the noise, peak, energy, and data transition thresholds based on the noise event signal and the peak event signal. The digital controller also outputs data signals to a media access controller via a media independent interface based upon at least one of the energy event signals and the data signals. Generation of the envelope signal and the energy signal enables the digital controller to use alternative detection techniques for recovering data from the network signals, depending on the signal quality of network signals received from the telephone line medium. Moreover, the control of the noise, peak, energy, and data transition thresholds by the digital controller also enables the slicer circuits to be optimized for detecting the data events and the energy events by adjusting the different thresholds based on the noise event signal and the peak event signal.

Hence, the physical layer transceiver provides a robust data detection system, capable of adapting receiver components to optimize recovery of data signals from different types of distorted signals.

Another aspect of the present invention provides a method of receiving network signals between network stations on a telephone line medium. The method includes selectively amplifying a received network signal, received via the telephone line medium and carrying receive data from a remote network station coupled to the telephone line medium, generating an envelope signal and an energy signal of the amplified received network signal, generating a noise event signal and a peak event signal in response to the envelope signal exceeding a noise threshold and a peak threshold, respectively, successively adjusting the noise threshold and the peak threshold based on successive noise event signals and peak event signals generated within a prescribed access identifier detection interval, setting a data transition threshold based on the adjusted peak threshold, and selectively recovering the receive data based on one of;the envelope signal exceeding the data transition threshold and the energy signal exceeding an energy threshold.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
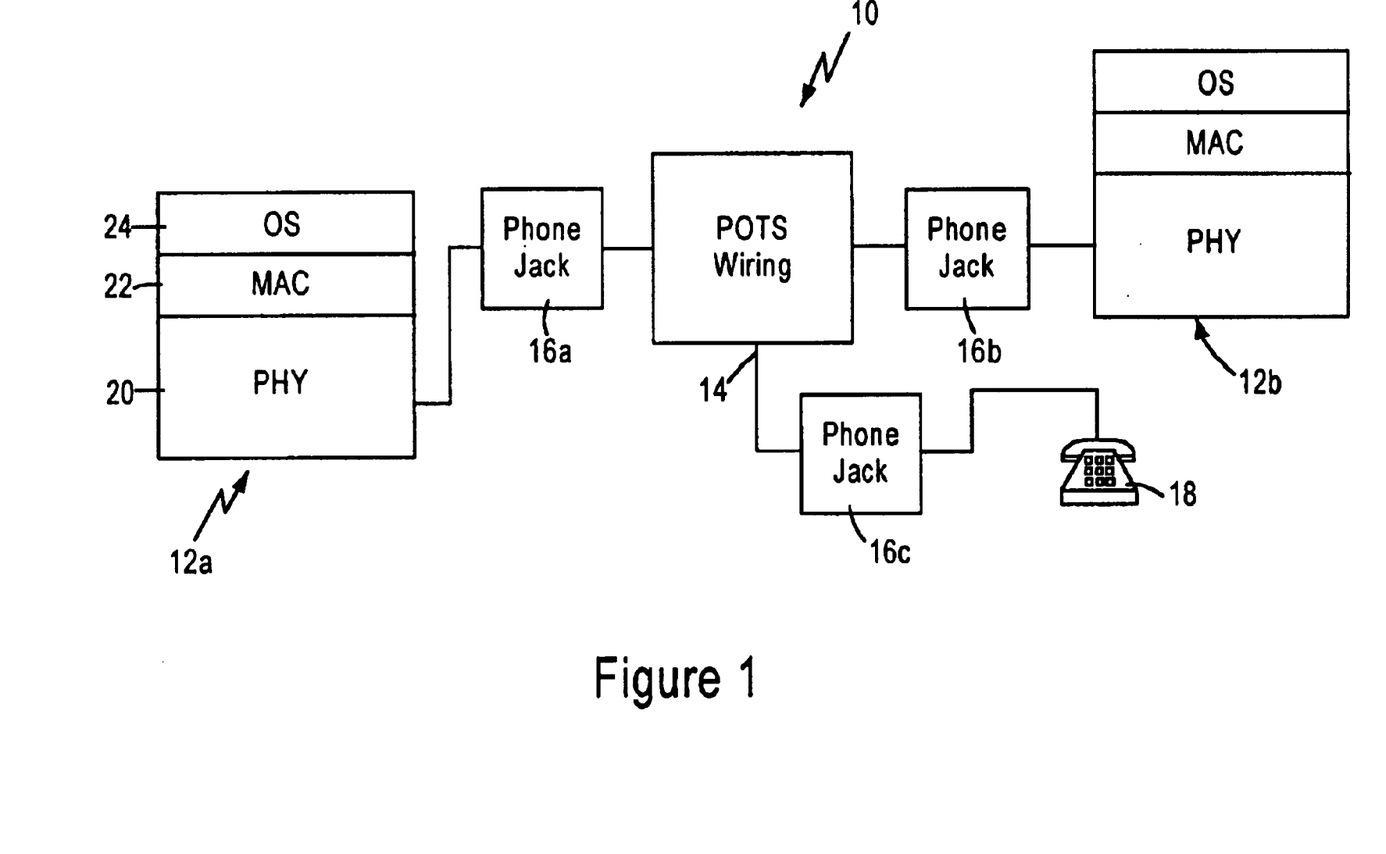
FIG. 1 is a block diagram illustrating a local area network deployed over residential twisted pair wiring.

FIG. 1 is a diagram of an Ethernet (IEEE 802.3) local area network 10 implemented in a home environment using twisted pair network media according to an embodiment of the invention. As shown in FIG. 1, the network 10 includes network stations 12a and 12b that are connected to a telephone line (twisted pair) wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model.

Figure 2A:
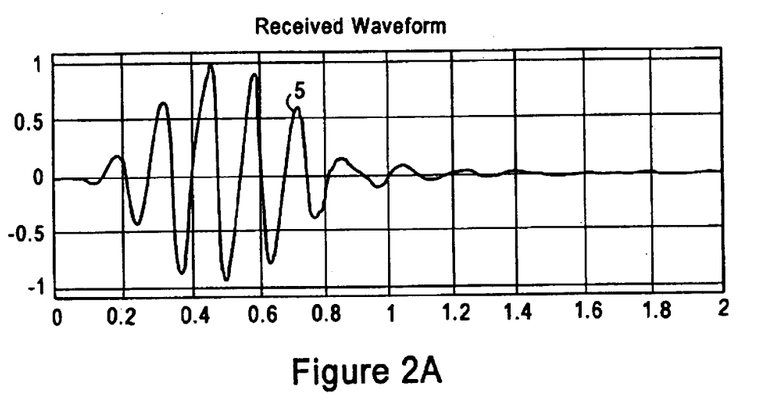
FIGS. 2A, 2B, 2C and 2D are diagrams illustrating processing of received waveforms by the physical layer transceiver of FIG. 1 according to an embodiment of the present invention.
Figure 2B:
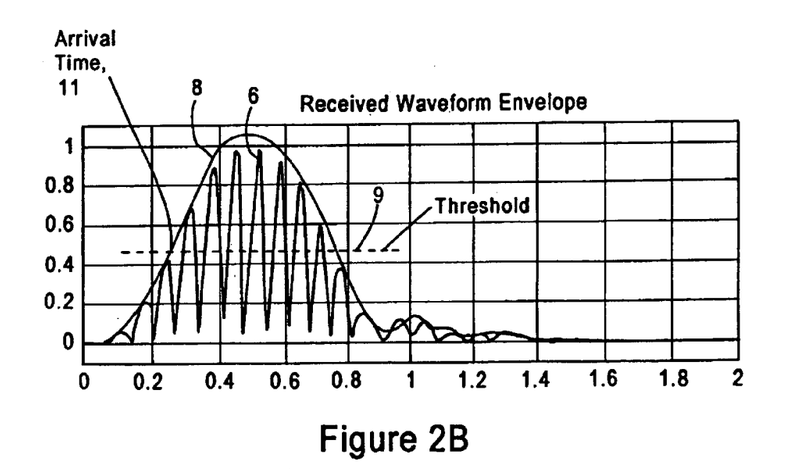

The stations 12a and 12b communicate by transmitting band limited pulses that carry network data modulated in the analog network signals. In particular, the physical layer transmitter transmits a band limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
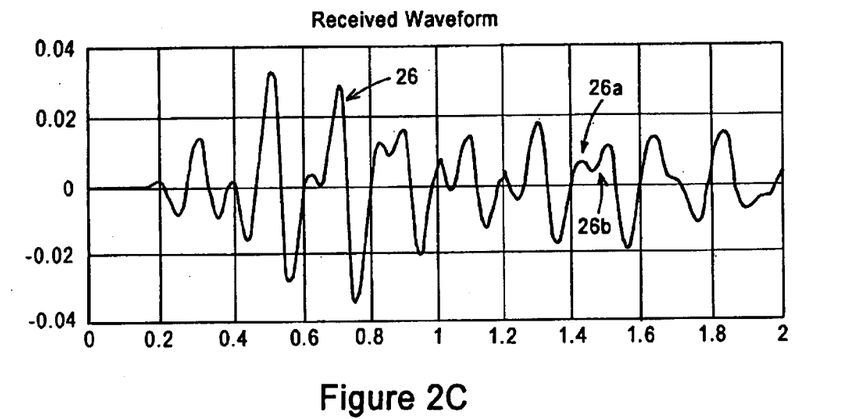
Figure 2D:
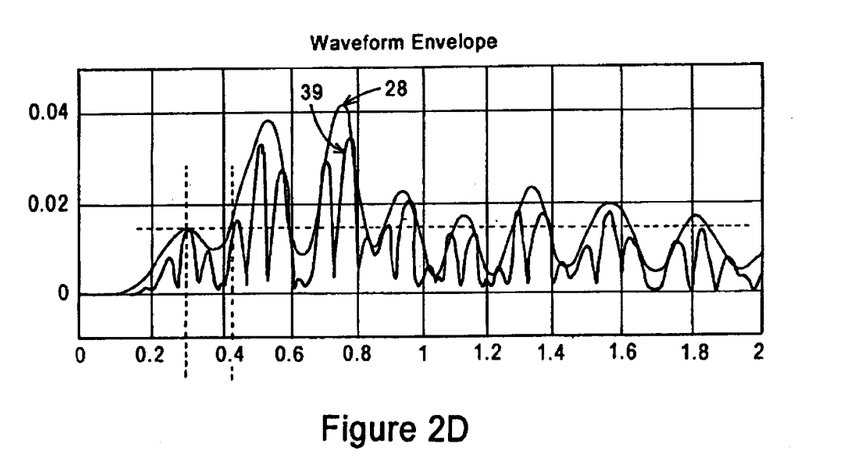

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recover errors.

According to the disclosed embodiment, an adaptive physical layer transceiver architecture adaptively adjusts the signal processing circuitry on both the receive side and transmit side to optimize accurate recovery data from the transmitted network signals, and optimize transmitter performance to overcome adverse conditions due to home telephone wiring topology.

Figure 3:
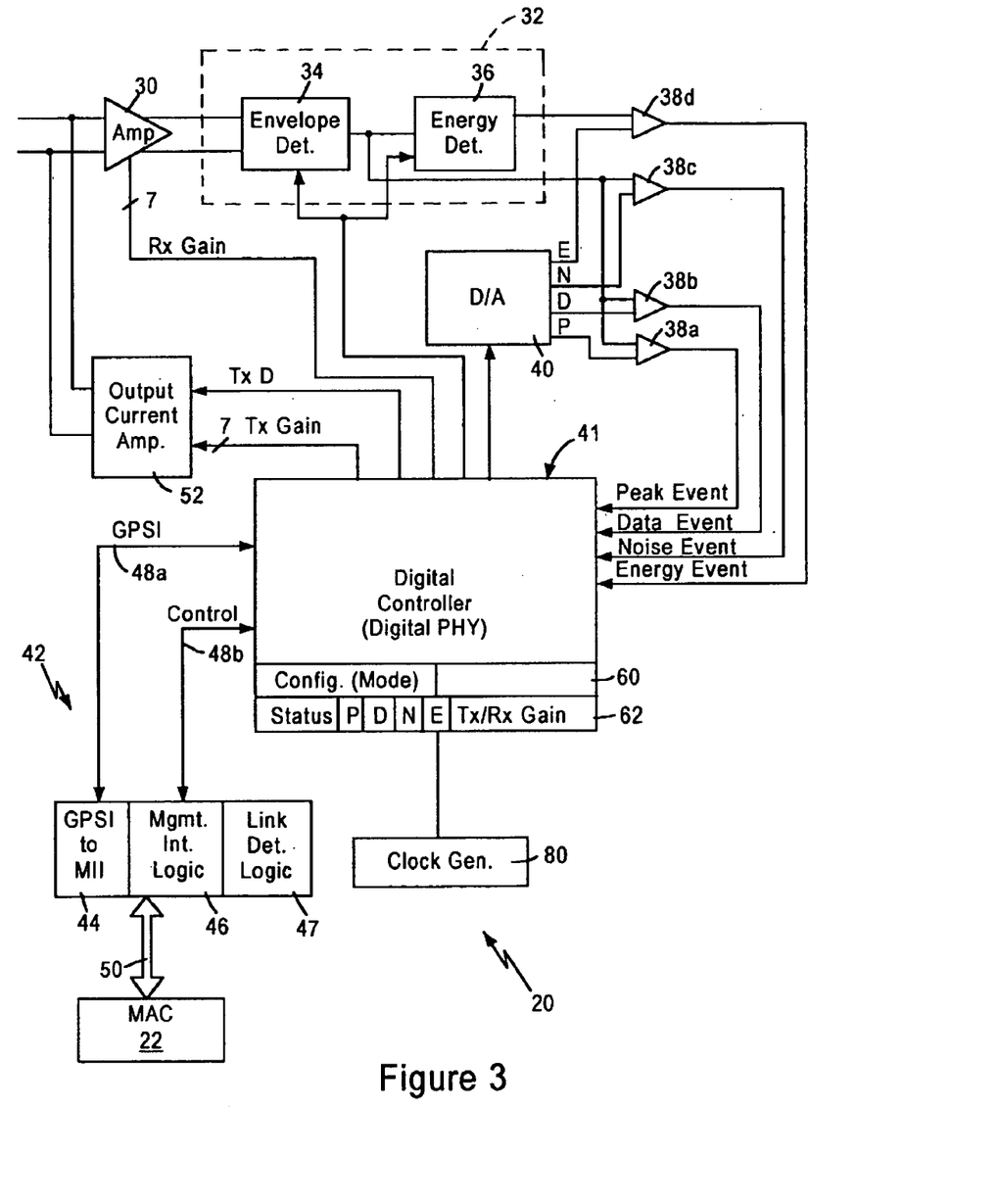
FIG. 3 is a block diagram illustrating the architecture of the physical layer transceiver of FIG. 1 according an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network received from the telephone medium, such as the network signals shown in FIG. 2C. As described below, the input amplifier 30 has a variable gain controlled by a 7-bit gain signal (RxGain) for amplifying received network signals. The physical layer transceiver 20 also includes a signal conditioning circuit 32 that includes an envelope detection circuit 34 and an energy detection circuit 36. The envelope detection circuit 34 generates the envelope signal 28 in response to the amplified received signal 26. For example, the envelope detector 34 includes an absolute value circuit (e.g., a rectifier circuit) that generates an absolute value signal 39 of the amplified received signal 26, and a low pass filter coupled to the rectifier circuit for filtering out high-frequency components the rectified signal, resulting in the envelope signal 28. The envelope signal 28 is output from the envelope detector 34 and supplied to the energy detector 36. The energy detector 36 includes an integrator which performs the mathematical process of integration over time to produce a signal proportional to energy of the received pulse signal.

As shown in FIG. 3, physical layer transceiver 20 also includes a plurality of slicer circuits 38, and a digital to analog converter 40 for supplying analog threshold signals to the slicer circuits 38. The physical layer transceiver also includes a digital controller 41 configured for controlling the digital analog converter 40 for outputting the threshold signal E, N, D, P, described below.

In particular, the digital controller 41 is configured for controlling the threshold values applied to the slicers 38a, 38b, and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40 under the control of the digital controller 41. Slicer circuits 38b and 38c output data event signals and noise event signals indicating with respect to time whether the envelope signal 28 exceeds a data transition threshold (D) and a noise threshold (N) respectively. The slicer circuit 38d outputs an energy event signal indicating with respect to time whether the energy signal output by energy detector 36 exceeds an energy threshold (E) supplied by the D/A converter 40.

Hence, the slicer circuits 38a, 38b, and 38c output peak, data transition, and noise event signals indicating with respect to time whether the envelope signal 28 exceeds a peak threshold (P), a data transition threshold (D), and a noise threshold (N), respectively. Slicer 38d, however, outputs an energy event signal indicating with respect to time whether the energy signal from the energy detector 36 exceeds an energy threshold (E).

The digital controller 41 controls the noise, peak and data transition thresholds based on the noise event signals and the peak signals output by the slicers 38c and 38a, respectively, and outputs digital data signals to the media access controller 22 via a media independent interface (MII) 50 based on either the energy event signals or the data event signals.

In particular, the digital controller 41 adjusts the gain of the amplifier 30, and the threshold values P, D, N, and E generated by the D to A converter 40 during an access ID (AID) interval. AID is a specific identifier which is unique for each network station 12. AID is a series of 8 pulses output from the PHY transceiver 20 of the transmitting station onto the telephone medium 14, where the time intervals between the first pulse and the successive 7 pulses define respective values. For example, assume a second pulse is output by the PHY transceiver 20 following a first pulse at time T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values used in time intervals T2, T3, T4, T5, and T7. Hence, the presence of the valid AD can be determined by detecting a first pulse, and detecting a presence of 7 successive pulses using detection windows each having a duration of 128 clock cycles.

According to the disclosed embodiment, AID replaces the preamble conventionally used in 10 Base-T Ethernet (IEEE 802.3) systems. Hence, the digital controller 41 of the present invention uses the AID interval to selectively tune the input amplifier 30 to one of 128 different gain settings selected by the RxGain signal, and set the threshold values used by the slicer circuits 38 by supplying digital threshold values to the D/A converter 40. Once the digital controller 41 has tuned the input amplifier 30 and the threshold values of the slicer circuits 38, the digital controller 41 uses either the data transition event signals from the slicer circuit 38b or the energy event signal from the slicer circuit 38d for recovering the data signals, described below.

The physical layer transceiver also includes a transmitter portion 52 (e.g., an output current amplifier), that converts transmit data (TxD) to an analog network signal. The analog network signal is output at a selected one of 128 output gain values based on the 7-bit transmit gain (TxGain) signal output by the digital controller 41.

As shown in FIG. 3, the physical layer transceiver 20 also includes an output interface 42 including an MII to general purpose serial interface (GPSI) converter 44, management interface logic 46, and buses 48a and 48b. The bus 48a transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48a.

The output interface 42 also includes a control data bus 48b for transferring configuration data and status information between the digital converter 41 and the management interface logic 46. In particular, the management interface logic 46 is configured for storing configuration data, received from the MAC 22 via the MII 50, into the digital controller 41 at selected control registers 60. Note that the threshold value E for the energy detector slicer circuit 38d may be supplied by the management agent via the MII 50 and set in the configuration registers 60. The digital controller 41 also includes status registers 62 that include, for example, the threshold values for the threshold signals P, D, and E, and the 7-bit input and output amplifier gain control signals (RxGain, TxGain). Hence, a management agent can access registers 60 and 62 for reading and writing of control information, and reading status information from the status registers 62. The interface 42 also includes link detection logic 47 for determining whether a valid link is detected on the network medium 14. If no valid AID is detected within three successive detection intervals, each having a preferred duration of about 800 milliseconds, the link status is sent to an invalid state. A valid AID may be either a link packet or a preamble for a data packet.

Figure 4:
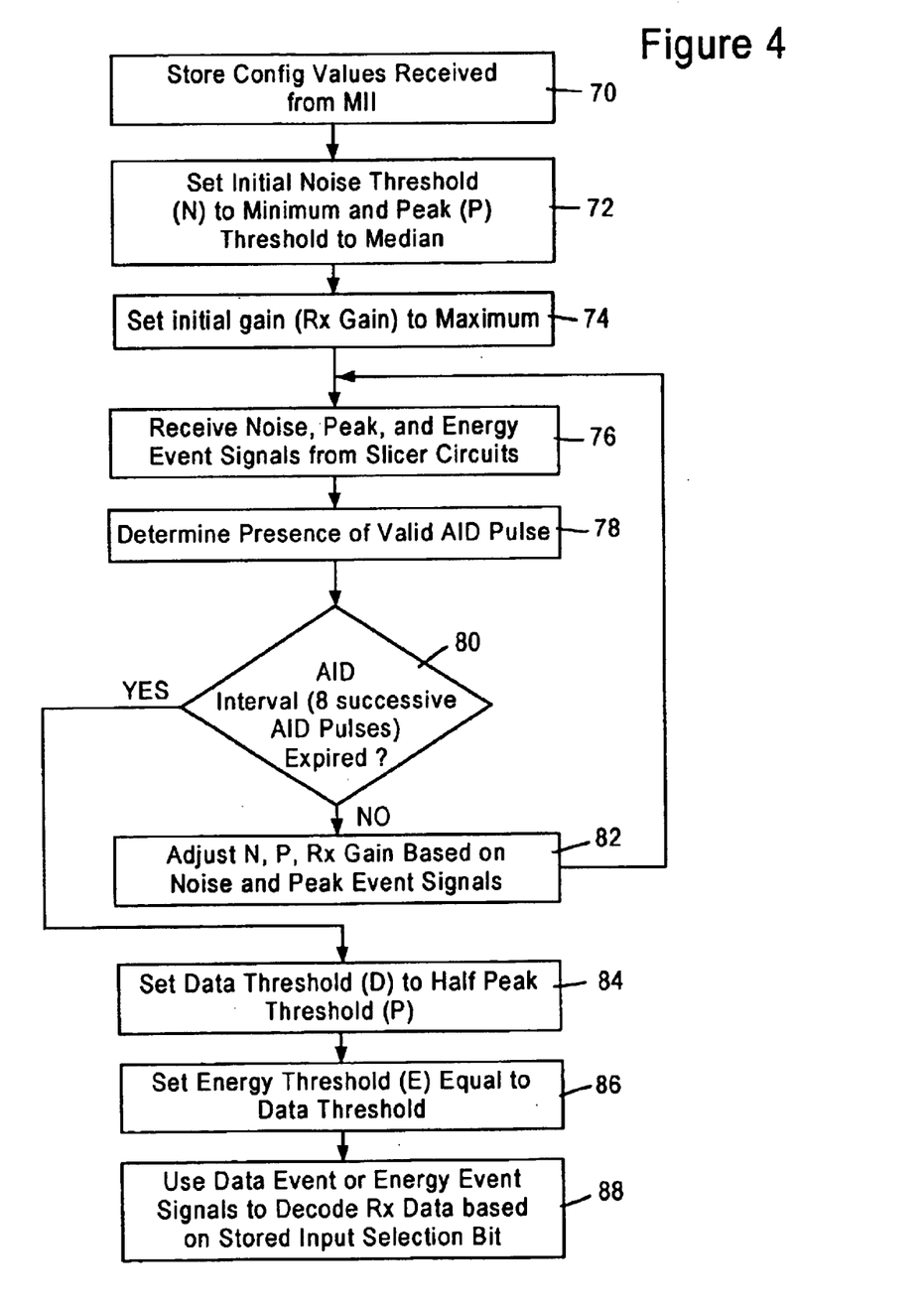
FIG. 4 is a flow diagram illustrating the operation of the digital controller of FIG. 3.

FIG. 4 is a diagram illustrating the receive operation of digital controller 41 according to an embodiment of the present invention. As shown in FIG. 4, the digital controller 41 is initialized in step 70 by storing configuration values received from the MAC 22 via the MU 50 into the control registers 60. The digital controller 41 then initially sets the noise threshold (N) in the D/A converter 40 to a minimum value and the peak threshold at a midpoint or median level at step 72. In particular, the PHY transceiver 20 must be able to detect received signals 26 having a voltage range of about 10 millivolts up to 1 to 2 volts, due to the unpredictable signal conditions caused by the wiring topology of the POTS wiring 14. The initial gain of the input amplifier 30 is also set to a maximum gain in step 74 to maximize the sensitivity of the receiver section.

After initialization of the input amplifier 30 and the thresholds for the peak slicer circuits 38a and noise slicer circuit 38c, the digital controller 41 begins monitoring the received noise, peak, and energy event signals from the slicer circuits 38 in step 76.

The digital controller 41 determines from the received noise and peak event signal whether a valid AID pulse is detected in step 78. As described above, if the noise and peak event signals are interpreted as a valid AID pulse, as opposed to a noise signal, the digital controller 41 determines in step 80 whether the AID interval defined by the 8 successive pulses has expired. If the AID interval has not expired, the digital controller 41 adjusts the noise (N) and peak thresholds (P), as well as gain (RxGain) of the input amplifier 30, based on the noise and peak event signals in step 82. In particular, the digital controller adjusts the values in step 82 using binary search techniques. The digital controller 41 successively adjusts the noise and peak thresholds as well as input gain, based on the successively received peak values for each successively received AID pulse, until the end of the AID interval is detected in step 80.

Once the digital controller 41 determines the size of the received AID pulses as represented by the envelope waveform 28, the digital controller 41 sets the data transition threshold (D) for the slicer circuit 38b to approximately half the size of the determined peak value, namely half the value of the peak threshold (P) in step 84. The digital controller 41 also sets the energy threshold (E) for the slicer circuit 38d in step 86 to equal the data transition threshold (D). Alternately the energy threshold (E) may be set based on a storage configuration value supplied by a management agent and stored in the control register 60.

The digital controller 41 then recovers the data following the AID preamble by using either the data event signal or the energy event signal from the respective slicer circuits 38b or

38d based on the stored input selection bit mode in step 86. In particular, the digital controller 41 has a mode that selects whether to use the data event signal from the slicer circuit 38b or the energy event signal from the slicer circuit 38d based on the stored input selection bit controlled by the management entity via the management interface logic 46 and the control data bus 48b. Use of the energy signal from the energy detector 36 is particularly effective if the wiring topology of the twisted pair medium causes the original pulse to be severely distorted. In other words, a severely-distorted envelope signal may not be able to provide a unique time relative to the data transition threshold (D). Hence, the digital controller 41 can be selectively configured for using the energy event signal, since the energy signal output by the energy detector 36 provides a constantly rising signal, enabling the comparator 38d to provide an accurate energy event signal that indicates with respect to time when the energy signal exceeds the energy threshold. Hence, the digital controller 41 can be selected to decode the data based on either the data event signal from the slicer circuit 38b, or the energy event signal from the slicer circuit 38d.

As recognized in the art, the digital controller 41 uses either the data event signal or the energy event signal to recover the digital data, for example by first synchronizing a digital phase lock loop (DPLL) in the clock generator circuit 80 to perform clock recovery of the transmit clock, following by decoding including 5B/4B decoding, descrambling, etc., to recover the serial data stream carried by the network signal transmitted via the medium 14.

According to the disclosed embodiment, a physical layer transceiver architecture adaptively determines the optimum input amplifier gain and threshold value during a preamble phase of a data packet transmitted on the home network, where AID pulses are used to optimize the physical layer transceiver for accurate detection of data in the received network signals. Although the received analog network signals may encounter severe distortion and signal degradation on the telephone line medium, resulting in signal voltage ranges between 10 millivolts and 2 volts, the physical layer transceiver of the present invention can adapt the receiver circuitry during the AID interval to optimize reception on a per-packet basis.

Similarly, the transmitter portion 52 may be selectively tuned for different destination nodes, based upon the received signal characteristic from a corresponding network node. Hence, the above-described information, obtained during tuning during the AID interval for a given transmitting network station, may be used by the digital controller 41 to set the gain for the transmitting drivers 52 such that data packets destined for destination stations encountering severe degradation will have substantially high output gain in the drivers 52, whereas nearby network stations encountering little degradation will have reduced gain in the output amplifiers 52.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A physical layer transceiver for sending and receiving network signals on a telephone line medium, the physical layer transceiver comprising:

an input amplifier for amplifying network signals received from the telephone line medium and outputting amplified received signals;

a signal conditioning circuit configured for outputting an envelope signal of the amplified received signals and an energy signal of the amplified received signals;

slicer circuits for outputting noise, peak, and data event signals indicating with respect to time whether the envelope signal exceeds a noise threshold, a peak threshold, and a data transition threshold, respectively, and for outputting energy event signals indicating with respect to time whether the energy signal exceeds an energy threshold; and a digital controller configured for controlling the noise, peak, and data transition thresholds based on the noise event signal and the peak event signal, the digital controller outputting data signals to a media access controller via a media independent interface based on at least one of the energy event signals and the data event signals.

2. The transceiver of claim 1, further comprising a digital to analog converter for supplying the noise threshold, the peak threshold, the energy threshold, and the data transition threshold to the slicer circuits in response to digital control signals output from the digital controller.

3. The transceiver of claim 2, wherein the digital controller initially sets the noise threshold to a minimum noise threshold level, the digital controller configured for adjusting the noise threshold and the peak threshold based on the noise event signals and the peak event signals.

4. The transceiver of claim 3, wherein the digital controller initially sets the peak threshold to a median peak threshold level, the digital controller adjusting the peak threshold to a final peak threshold based on a prescribed number of successively received peak event values.

5. The transceiver of claim 4, wherein the digital controller is configured for setting the data transition threshold to about half the value of the final peak threshold.

6. The transceiver of claim 3, wherein the digital controller is configured for detecting a presence of valid access identifier pulses in the received network signals based on reception of at least one of the noise event signals and the peak event signals at prescribed intervals.

7. The transceiver of claim 6, wherein the digital controller includes a control configuration register for storing an input selection bit for selecting one of the data event signal and the energy event signals for generation of the data signals following a prescribed number of the valid access identifier pulses.

8. The transceiver of claim 3, wherein the digital controller selectively adjusts a gain of the input amplifier based on the noise event signal and the peak event signal.

9. The transceiver of claim 8, wherein the digital controller sets the gain to an initial maximum value, the digital controller selectively reducing the gain based on the noise event signal and the peak event signal.

10. The transceiver of claim 1, wherein the digital controller includes management interface logic for storing configuration data, received from the media access controller via the media independent interface, into the digital controller.

11. The transceiver of claim 10, wherein the management interface logic selectively outputs status information stored in the digital controller onto the media independent interface in response to a read request from the media access controller.

12. The transceiver of claim 11, further comprising a control bus for transferring the configuration data and the status information between the digital controller and the management interface logic.

13. The transceiver of claim 12, wherein the status information includes the values of the noise threshold, the peak threshold, the energy threshold, and the data transition threshold.

14. The transceiver of claim 1, further comprising a current source driver for outputting analog network signals carrying transmit data supplied to the digital controller from the media independent interface, the current source driver outputting the analog network signals according to a gain controlled by the digital controller.

15. The transceiver of claim 14, wherein the gain has a plurality of settings based on a multiple-bit gain value stored in the digital controller.

16. The transceiver of claim 1, wherein the input amplifier has a gain controlled based on a multiple-bit gain value stored in the digital controller.

17. A method in a physical layer transceiver of sending and receiving network signals between network stations on a telephone line medium, and between a media access controller coupled to the physical layer transceiver by a media independent interface, the method comprising:

selectively amplifying a received network signal, received via the telephone line medium and carrying receive data from a remote network station coupled to the telephone line medium;

generating an envelope signal and an energy signal of the amplified received network signal;

generating a noise event signal and a peak event signal in response to the envelope signal exceeding a noise threshold and a peak threshold, respectively;

successively adjusting the noise threshold and the peak threshold based on successive noise event signals and peak event signals generated within a prescribed access identifier detection interval;

setting a data transition threshold based on the adjusted peak threshold; and selectively recovering onto the media independent interface the receive data based on one of the envelope signal exceeding the data transition threshold and the energy signal exceeding an energy threshold.

18. The method of claim 17, further comprising initially setting the noise threshold to a minimum value, the successively adjusting step including selectively increasing the noise threshold based on the successive noise event signals and the peak event signals.

19. The method of claim 17, further comprising selecting one of the envelope signal and the energy signal for recovering the receive data based on control signals received by the physical layer transceiver via the media independent interface.

20. The method of claim 19, further comprising outputting the noise threshold, the peak threshold, the data transition threshold, and the energy threshold as status information to a management agent via the media independent interface.

* * * * *